United States Patent [19]

Kalfoglou

[11] Patent Number: 5,167,281

[45] Date of Patent: Dec. 1, 1992

[54] DIALKYLATE ADDITIVES FOR SURFACTANT SYTEMS

[75] Inventor: George Kalfoglou, Houston, Tex.

[73] Assignee: Texaco Inc., White Plains, N.Y.

[21] Appl. No.: 788,914

[22] Filed: Nov. 7, 1991

[51] Int. Cl.$^5$ .............................................. E21B 43/22
[52] U.S. Cl. ..................... 166/275; 166/274; 252/8.554
[58] Field of Search ............ 166/270, 274, 275, 305.1; 252/8.554; 530/504

[56] References Cited

U.S. PATENT DOCUMENTS

| | | | |
|---|---|---|---|
| 4,455,255 | 6/1984 | Stapp | 166/275 X |
| 4,469,608 | 9/1984 | Hinkamp | 166/275 X |
| 4,528,105 | 7/1985 | Ito et al. | 166/275 X |
| 4,536,301 | 8/1985 | Malloy et al. | 252/8.554 |
| 4,597,879 | 7/1986 | Morita et al. | 252/8.554 |
| 4,600,516 | 7/1986 | Wester et al. | 252/8.554 |
| 4,976,315 | 12/1990 | Prokop et al. | 166/270 |
| 5,092,405 | 3/1992 | Prukop | 166/272 |
| 5,094,295 | 3/1992 | Morrow | 166/274 |
| 5,095,989 | 3/1992 | Prukop | 166/305.1 |
| 5,739,041 | 4/1988 | Morrow et al. | 530/504 |

*Primary Examiner*—Ramon S. Britts
*Assistant Examiner*—Frank S. Tsay
*Attorney, Agent, or Firm*—Jack H. Park; Kenneth R. Priem; Harold J. Delhommer

[57] ABSTRACT

The invention is a method of moving hydrocarbons through an underground formation for later recovery which comprises injecting an aqueous surfactant system having about 0.5% to about 10% of one or more surfactants and about 0.5% to about 10% of an alkoxylated dialkylate having the formula:

$$R_1(R_3O)_nR_2$$

wherein $R_1$ and $R_2$ are alkyl chains having about 3 to about 30 carbon atoms, $R_3$ is $C_2H_4$, $C_3H_6$ or a mixture of $C_2H_4$ and $C_3H_6$, and n equals about 4 to about 300.

14 Claims, 3 Drawing Sheets

DIALKYLATE ADDITIVES FOR SURFACTANT SYTEMS

BACKGROUND OF THE INVENTION

The invention relates to surfactant systems comprising alkoxylated dialkylates. More particularly, the invention concerns the addition of polyethoxylated or polypropoxylated dialkylates to increase the viscosity of surfactant systems and to employ such systems in the enhanced recovery of oil from subterranean formations by surfactant flooding.

In enhanced oil recovery, surfactants are used in micellar and microemulsion floods. By lowering the interfacial tension between reservoir oil and the flood water and connate water, surfactants permit the trapped oil droplets in the reservoir to flow with the surfactant flood water.

Although surfactant flooding is effective in some circumstances in recovering additional oil, it has a number of shortcomings which reduce its value as an economical process. The greatest problem inherently associated with surfactant flooding is poor conformance due to the poor sweep efficiency of surfactant flooding. This is caused by micellar fluids fingering through the reservoir and bypassing large amounts of oil. A principle reason for fingering and poor conformance is the propensity of surfactant systems to move through the reservoir at a faster rate than the displaced oil due in part to the relatively lower viscosity of the surfactant system.

The mobility ratio between the displacing surfactant system and the displaced oil can be improved by viscosifying the surfactant system. A variety of materials have been suggested for incorporation into surfactant and microemulsion systems to increase their viscosity. U.S. Pat. Nos. 3,719,606; 3,827,496; 3,981,361 and others disclose formulations which include polymers as viscosity increasing agents.

Unfortunately, it is nearly impossible to dissolve enough polymer into a micellar or microemulsion system to obtain highly viscous, stable, one-phase systems. Phase separation between the polymer and the micellar phases usually occurs at desirable polymer concentrations. This problem is more acute at salinities typical of most reservoir brines. Salinity reduction may decrease the polymer/surfactant compatibility problem, but usually leads to an increase in the interfacial tension between surfactant and oil. For an effective surfactant or microemulsion process to recover substantial quantities of oil, one needs to have both low interfacial tension and mobility control.

U.S. Pat. No. 4,271,907 teaches one method of incorporating polymers such as polyacrylamides or polysaccharides in a microemulsion system while avoiding some phase separation problems. Greater compatibility with polymers is achieved by incorporating an oil into the microemulsion having an equivalent alkane carbon number (EACN) greater than that of the crude oil for which microemulsion system is designed. Although an improvement, phase separation still occurs and system viscosity cannot be raised to the levels desired.

Once a high EACN microemulsion is injected into a reservoir, it will equilibrate with the environment. As a result, the EACN of the microemulsion oil will decrease due to reservoir crude transporting into the microemulsion. Additionally, the salinity hardness (divalent ion concentration) of the microemulsion will increase as a result of picking up divalent ions from the reservoir matrix. Increased hardness increases phase separation of the polymer from the microemulsion.

SUMMARY OF THE INVENTION

The invention is a method of moving hydrocarbons through an underground hydrocarbon formation for recovery by a production well, which comprises injecting into the formation about 0.05 to about 1.0 pore volumes of an aqueous surfactant slug comprising about 0.5% to about 10% of surfactant and about 0.5% to about 10% of an alkoxylated dialkylate. The dialkylate has the formula:

$$R_1(R_3O)_nR_2$$ 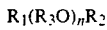

where $R_1$ and $R_2$ are alkyl chains having about 3 to about 30 carbon atoms, $R_3$ is $C_2H_4$, $C_3H_6$ or a mixture of $C_2H_4$ and $C_3H_6$, and n equals about 4 to about 300.

DETAILED DESCRIPTION

Figure 2:
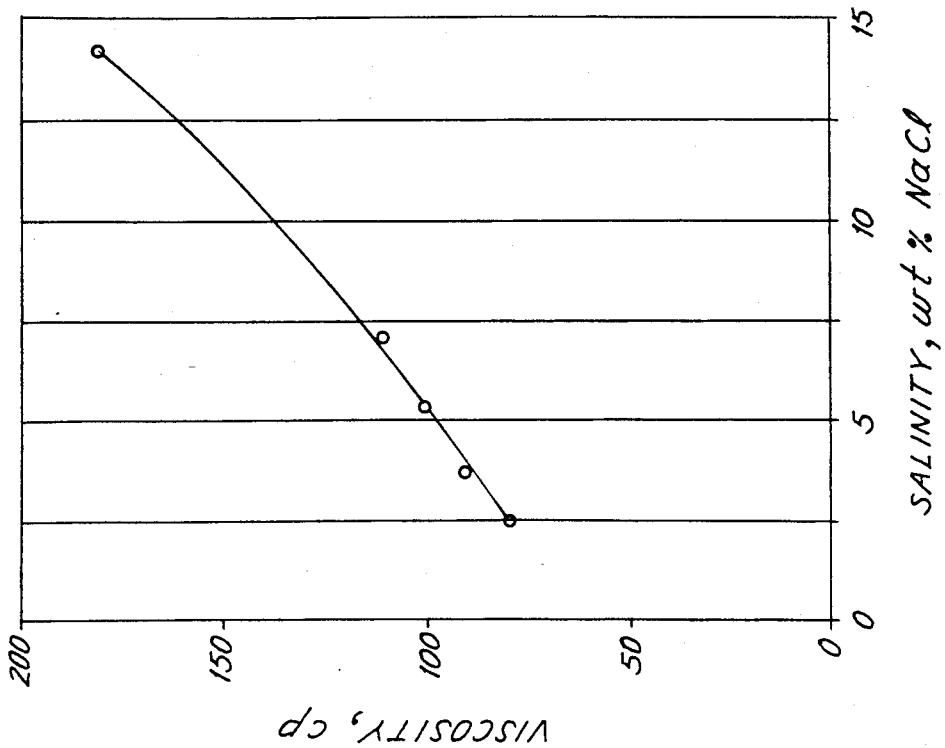
FIG. 2 is a graph plotting the increasing viscosity of an anionic surfactant/dialkylate system as the salinity increases.

Effective surfactant system flooding of an underground hydrocarbon formation can be obtained through the use of an aqueous surfactant system or microemulsion additionally containing alkoxylated dialkylate as defined within. Furthermore, the viscosity of surfactant systems designed for uses other than enhanced oil recovery may be increased by the addition of an alkoxylated dialkylate according to the conditions defined herein.

The invention comprises injecting into an underground formation about 0.05 to about 1.0 pore volumes of an aqueous surfactant system comprising about 0.5% to about 10% of one or more surfactants and about 0.5% to about 10% of an alkoxylated dialkylate having the formula:

$$R_1(R_3O)_nR_2$$ 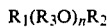

wherein $R_1$ and $R_2$ are alkyl chains having about 3 to about 30 carbon atoms, $R_3$ is $C_2H_4$, $C_3H_6$ or a mixture of $C_2H_4$ and $C_3H_6$, and n equals about 4 to about 300.

Alkoxylated dialkylates are not surfactants by themselves. They lack a hydrophilic end so they cannot distribute themselves between two phases across an interface. However, the use of such a dialkylate forms associative micellar networks with surfactants in the surfactant system. These micellar networks provide increased viscosity to the aqueous surfactant system and thus, provide mobility control during and after the injection of a surfactant system in an enhanced oil recovery process.

The polyalkoxydialkylate molecule defined herein has two hydrophobic chains attached to each end of the polyalkoxy chain. It is believed that the hydrophobic tails of the dialkylate molecule associate with the hydrophobic cores of two different surfactant micelles, forming a network of micelles and increasing the viscosity of the overall surfactant system. Since the dialkylate is nonionic, it is compatible with and forms associative micellar networks with nonionic, anionic, cationic and amphoteric surfactants.

Although a wide range of pore volumes of the surfactant system may be employed in recovering oil, the injected pore volumes of a surfactant slug will preferably range between about 0.1 and about 0.5 pore volumes, most preferably about 0.1 to about 0.3 pore volumes. Cost is the chief limiter of size for an injected slug. Surfactant system concentration may also very widely, but is preferably between about 1% and about 5% of one or more surfactants excluding dialkylate and about 1% to about 4% dialkylate.

The dialkylate will preferably have the formula:

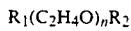

$$R_1(C_2H_4O)_nR_2$$

where n equals about 10 to about 250 and $R_1$ and $R_2$ are alkyl chains having about 7 to about 20 carbon atoms. More preferably, n will equal about 30 to about 200 and $R_1$ and $R_2$ will have about 7 to about 20 carbon atoms. There is no requirement for the $R_1$ and $R_2$ alkyl chains to be of equal length.

The characteristics of the surfactant/dialkylate systems of the present invention allow surfactant systems to be designed for normally difficult reservoir conditions such as high salinity of monovalent or divalent ions, difficult reservoir temperatures affecting surfactant solubility and loss of surfactant to the formation.

These associative micellar systems increase in viscosity as salinity increases. Viscosity also increases as the hardness of the water (divalent ion concentration) increases with a constant salinity. Thus, it can be concluded that increases in salinity and increasing divalent ion concentration promote the micellar network structure. With these dialkylate surfactant systems, a surfactant flood may be designed for use in relatively high salinity reservoir environments, a difficult task with present surfactant systems. At higher salinities, one can employ a lower concentration of dialkylate in the surfactant system and achieve the same viscosity.

The addition of dialkylate to surfactant systems according to the present invention may also elevate the cloud point of the overall surfactant system. The cloud point temperature is the temperature at which a surfactant system will change from water solubility to oil solubility. Since water solubility is highly desirable to mix and maintain a stable surfactant system prior to injection, the addition of the dialkylate to a surfactant system may elevate the cloud point temperature sufficiently to maintain water solubility at relatively high ambient temperatures. The careful use of such cloud point properties may permit the use of a surfactant system that is ordinarily not capable of being used in certain reservoirs with warm ambient air temperatures.

The formation of the associative micellar networks in the surfactant systems of the present invention may also result in a lower loss of surfactant to the formation.

Once injected into a reservoir, surfactant systems lose surfactant to the matrix by a variety of mechanisms. Chief among these mechanisms is adsorption. However, the formation of the micellar networks provides greater resistance to surfactant loss from the surfactant system. Thus, the alkoxylated dialkylates function as adsorption inhibitive agents. Sacrificial agents known in the prior art, such as various lignin and lignonsulfonate derivatives, polyalkylene glycols and other compounds known in the enhanced oil recovery literature as useful with surfactant systems, may also be employed to further minimize the loss of surfactants to the formation.

Another advantageous property of the invention surfactant systems is that high shear does not permanently lower viscosity. High shear such as encountered in the injection of a surfactant system through a sandface or through pumps and valves, results in only a fleeting loss of viscosity. Within minutes, the high viscosity characteristics of the invention surfactant systems are restored. With the systems tested, it is as if the high shear did not occur.

Because of the characteristics of these systems, it is believed that long ethylene oxide or propylene chains will promote more associative networks at lower dialkylate concentrations. Longer alkyl chains should also affect viscosity, and depending upon the hydrophobic portion of the dialkylate, more associative networks should be formed, increasing viscosity. The examples discussed below bear this out. But the use of longer ethylene oxide chains may create water solubility problems, making it more difficult to solubilize the dialkylate in an aqueous system.

Greater flexibility in surfactant system design can be achieved with two or more dialkylates having different formulas, i.e., alkoxylate and alkyl chains having different lengths incorporated into the surfactant system. Such combinations of dialkylates may be particularly helpful in solving water solubility and phase stability problems.

It is well-known that conventional surfactant flooding systems are usually composed of one or more petroleum, petrochemical or synthetic sulfonates, one or more solubilizers or cosurfactants, brine and, optionally, a quantity of hydrocarbon. These components are normally combined to make a surfactant system. It is believed that the present invention may be employed with most known surfactant systems and still achieve the desired associative micellar networks. However, it is possible that for one reason or another several of the thousands of known surfactant systems may not be employed in the present invention. Such incompatibility may be determined by tests well-known to those skilled in the art.

Conventional surfactant systems are injected into a reservoir to form a front followed by the injection of additional brine or water which may contain a mobility control agent. A surfactant system is usually injected as a slug having about 10% to 50% of the pore volume of the reservoir with a total surfactant and solubilizer concentration of about 0.1% to about 10% by weight. A surfactant system may be:

1. One or more petroleum sulfonates such as,
   a. a water soluble sulfonate having a relatively low equivalent weight, and/or
   b. an oil soluble sulfonate having a relatively high equivalent weight, and/or c. any other commercially available surfactants including sulfonates or sulfates;

2. a solubilizer or cosurfactant such as sulfate or sulfonate salts of alkylpolyalkoxyalkyl or alkylarylpolyalkoxyalkyl compounds such as polyethoxylated alcohols or alkylphenols;

3. brine; and 4. optionally, a light hydrocarbon.

As mentioned before, surfactant flooding systems can be formulated under some conditions without a solubilizer and with only a sole surfactant. Such systems may also be employed with the addition of the dialkylate according to the present invention. Petrochemical and synthetic sulfonates may also be substituted for petroleum sulfonates. The surfactant slug may contain or be preceded by a sacrificial agent. Various emulsions or microemulsions employing surfactants may also take the place of a true surfactant solution. The present invention resides in the use of about 0.1% to about 10% concentration by weight of dialkylate in a surfactant system.

Surfactant systems are generally pushed through the formation towards a production well by the subsequent injection of a drive fluid. The drive fluid is usually water, gas or water viscosified by a polymer. Eventually, hydrocarbons and other fluids are then recovered at one or more production wells. Although it may not be necessary, it is preferred to inject a drive fluid into the formation after the injection of a surfactant slug comprising one or more surfactants and an alkoxylated dialkylate according to the present invention.

The invention also comprises a method of creating a relatively viscous surfactant system which comprises adding to an aqueous surfactant system about 0.5% to about 10% by weight of an alkoxylated dialkylate having the invention formula to increase the viscosity of the surfactant system. This method of increasing surfactant system viscosity is believed to be compatible with most surfactant systems of widely varying surfactant components and concentrations and is not limited to enhanced oil recovery systems.

The following examples will further illustrate the method of the present invention of surfactant systems comprising one or more surfactants and an alkoxylated dialkylate. These examples are given by way of illustration and not as limitations on the scope of the invention. Thus, it should be understood that procedures and amounts may be varied with the process still remaining within the scope of the invention.

EXAMPLES

The anionic surfactant used in the examples was LN-60COS. LN-60COS is a sulfated derivative of ethoxylated alcohol having approximately 12 to 14 carbon atoms, about 6 units of ethylene oxide and an equivalent weight of about 550 prepared by Texaco Chemical Co. Four alkoxylated dialkylates were tested. DAPRAL GT 282 is a trademarked tallow polyoxyethylene (60) myristyl glycol having the structure $C_{16-18}(EO)_{60}C_{12-14}$ sold by Akzo Chemie with an average molecular weight of about 3000. DAPRAL T 210 is a trademarked dialkylate having a longer ethylene oxide chain and shorter alkyl chains than DAPRAL GT 282 and a molecular weight of about 8000 sold by Akzo Chemie. It is believed that the $R_1$ and $R_2$ alkyl chains contain 8 to 10 carbon atoms. If the alkyl chains of DAPRAL T 210 contain 8 to 10 carbon atoms, then the ethylene oxide chain is probably about 170 to 180 units long. DAPRAL T 212 is a trademarked dialkylate having a longer ethylene oxide chain and longer alkyl chains than DAPRAL GT 282 and a molecular weight of about 8000 sold by Akzo Chemie. KESSCO PEG 6000 distearate is a trademarked dialkylate having the structure:

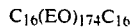

$$C_{16}(EO)_{174}C_{16}$$

sold by Stepan Chemical Co.

A 10% DAPRAL GT 282 stock solution was prepared in 2.5% NaCl by dissolving DAPRAL solids in a heated 2.5% NaCl solution (to 70° C.) and then cooling the solution down to room temperature (25° C.) while mixing. Micellar systems were prepared using 10% LN-60COS dissolved in 2.5% NaCl. Viscosities were measured using a Brookfield viscometer with the UL adapter.

FIG. 1

Figure 1:
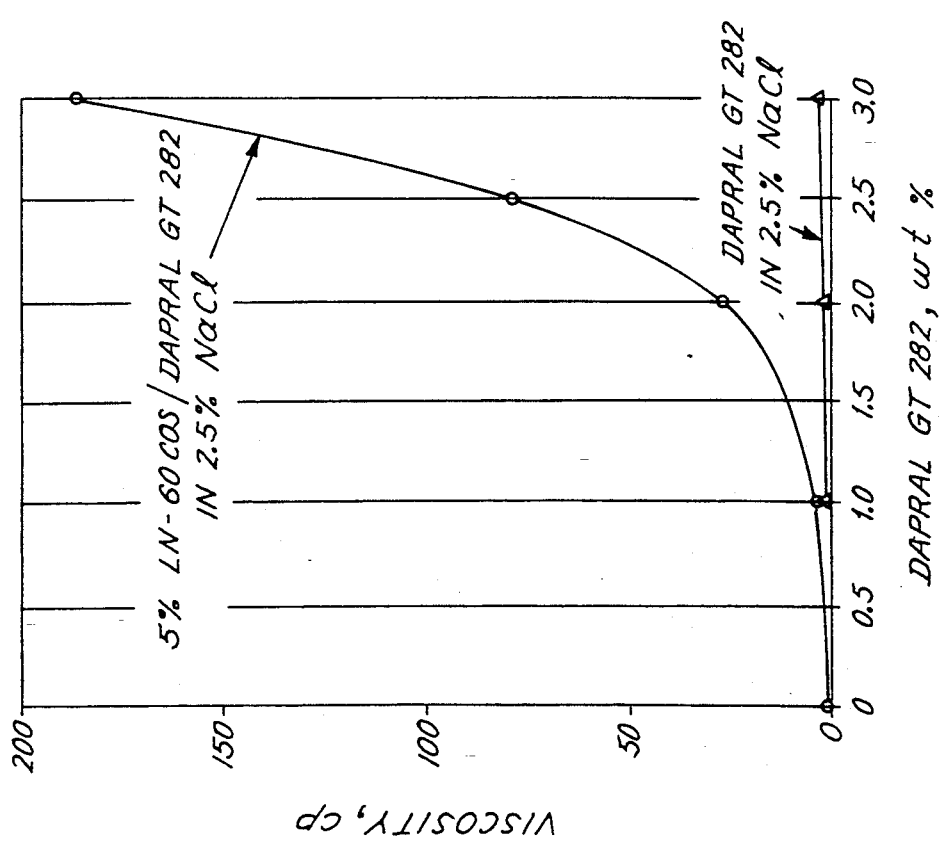
FIG. 1 is a graph plotting the increasing viscosity of an anionic surfactant/dialkylate system as the dialkylate concentration increases.

The examples plotted in FIG. 1 illustrate the effect on viscosity of 5% LN-60COS/DAPRAL GT 282 systems where the GT 282 concentration was varied between 0%, 1%, 2%, 2.5% and 3%. Salinity was 2.5% NaCl. The viscosity of the 5% LN-60COS without the dialkylate was 1.5 cp. The viscosities of the DAPRAL only solutions for concentrations of 1% to 3% ranged from 1.2 cp to 3.2 cp, respectively. However, as illustrated in FIG. 1, the viscosities of the LN-60COS/DAPRAL systems increased markedly above about 2% DAPRAL GT 282 in the system. Although the viscosity of the 5% LN-60COS system was 1.5 cp and the viscosity of 3% GT 282 was 3.2 cp, the viscosity of the combined 5% LN-60COS/3% GT 282 was 185 cp.

FIG. 2

The examples plotted in FIG. 2 illustrate the effect on viscosity by varying the salinity of the 5% LN-60COS/2.5% DAPRAL GT 282 system. FIG. 2 clearly illustrates that an increase in salinity increases the viscosity of the dialkylate/surfactant solutions. In the absence of DAPRAL GT 282, salinity should have a minimal effect on the viscosity of the surfactant solution. This salinity effect is attractive because it is generally difficult to generate high viscosities at high salinities with other system viscosifiers such as polymers. Anionic polymers, for example, lose viscosity with increased salinity.

Additional tests were run to determine the effect of divalent ion concentration on the 5% LN-60COS/2.5% DAPRAL GT 282 system at 7% NaCl with 0% $Ca^{+2}$ and 7% NaCl with 1% $Ca^{+2}$. The viscosity with no hardness was measured at 110 cp, whereas the system with 1% divalent ion concentration had a viscosity of 155 cp. These two tests show that hardness, in similar fashion to salinity, increases the viscosity of the LN-60COS/DAPRAL GT 282 system. Thus, the divalent ion concentration must be promoting additional micellar network formation. This characteristic is advantageous in oil recovery processes since at higher salinities and hardness usually encountered in reservoirs, one can employ a lower dialkylate concentration to generate the desired viscosity to achieve greater mobility control.

FIG. 3

Figure 3:
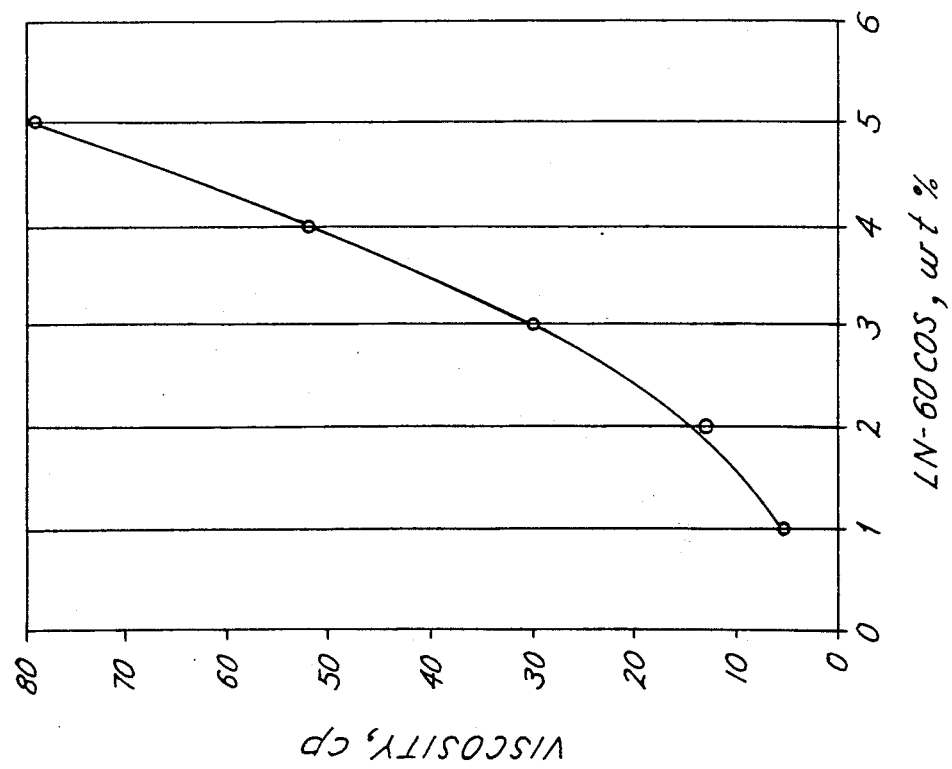
FIG. 3 is a graph plotting the increasing viscosity of an anionic surfactant/dialkylate system as the anionic surfactant concentration increases.

Several examples are plotted in FIG. 3 to illustrate the effect of LN-60COS concentration on the viscosity of a system containing LN-60COS, 2.5% DAPRAL GT 282 and 2.5% NaCl at 25° C. Viscosity increases substantially with higher LN-60COS concentration. This was expected because at higher surfactant concentrations, a more extensive micellar network should develop.

FIG. 4

Figure 4:
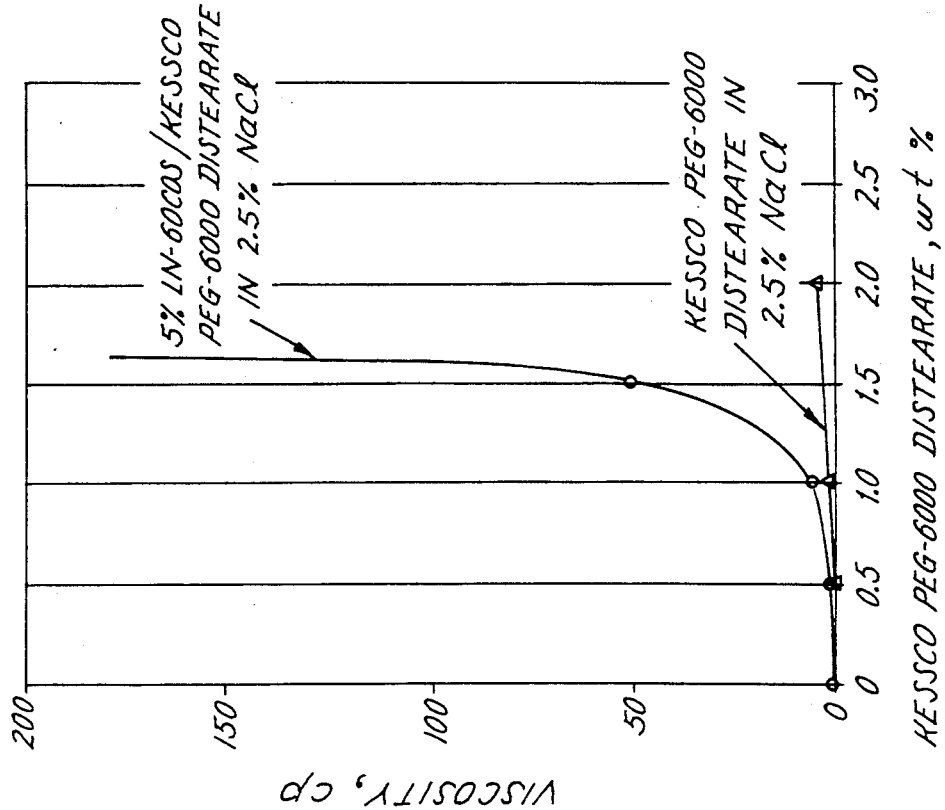
FIG. 4 is a graph plotting the increasing viscosity of an anionic surfactant/dialkylate system as the dialkylate concentration increases.

Several examples are plotted in FIG. 4 to illustrate the effect of KESSCO PEG-6000 distearate concentration on the viscosity of an invention system containing 5% LN-60COS and 2.5% NaCl. The KESSCO compound has hydrolytic stability up to about 70° C. As with the previous examples, the various solutions were prepared by combining 10% LN-60COS stock solutions with 10% KESSCO stock solutions and 2.5% NaCl.

The viscosity of 5% LN-60COS and 2.5% NaCl is 1.5 cp. The viscosity of the KESSCO distearate over the concentration range of 0.5% to 2% is 1.2 cp to 3.7 cp, respectively. However, the viscosity curve of the LN-60COS/KESSCO distearate exhibits a dramatic increase in viscosity starting with about 1% KESSCO concentration. The elevated viscosities observed for these mixtures demonstrate that the KESSCO polyoxyethylene distearate molecule associates with the other surfactant micelles to form substantial micellar networks.

FIG. 5

Two dialkylates having longer polyoxyethylene chains and higher molecular weights than DAPRAL GT 282 were tested. As earlier noted, the alkyl chains of DAPRAL T 210 are shorter than those of GT 282 and the alkyl chains of DAPRAL T 212 are longer than those of DAPRAL GT 282. Because of these differences in molecular structure, both compounds were expected to be more efficient in viscosifying surfactant systems according to the invention. The longer polyoxyethylene chains were expected to promote association of the polyoxyethylene dialkylate molecules through the oxyethylene groups, permitting the formation of associative networks at lower dialkylate concentrations.

Due to the length of the polyoxyethylene chains, these compounds were not soluble in water at all concentrations. Thus, they were added directly into the LN-60COS surfactant system rather than through prepared intermediate stock solutions. At times, solubilization was difficult, requiring the heating of the surfactant solution to as high as 40° C. while mixing in the DAPRAL T 210 or DAPRAL T 212. The surfactant systems containing LN-60COS and the dialkylate additives were equilibrated overnight in order to allow sufficient time for the micellar networks to form.

Unlike the previous examples, these systems were prepared in a 10% field brine (100,000 ppm TDS) having a composition of 36,600 ppm Na+ ions, 2000 ppm Ca+2 ions, 400 ppm Mg+2 ions, and 61,000 ppm Cl− ions.

Figure 5:
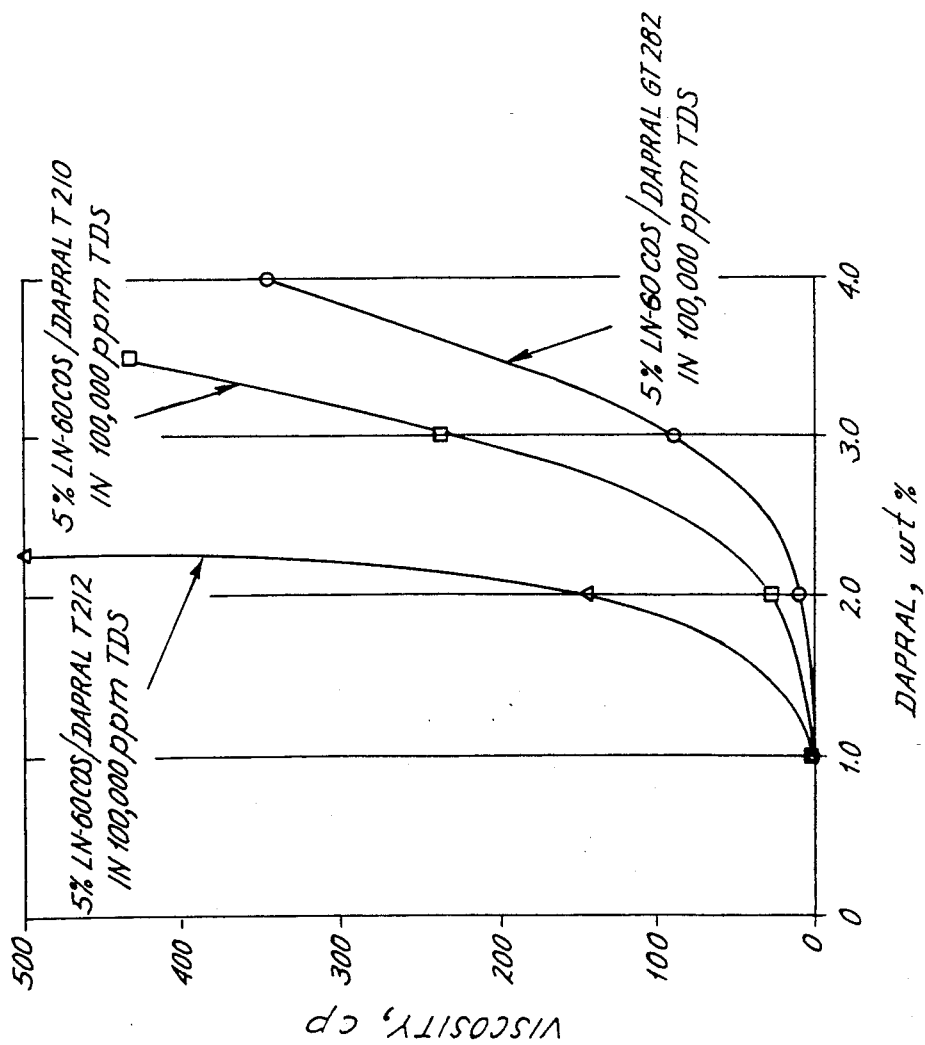
FIG. 5 is a graph plotting the increasing viscosity of three different anionic surfactant/dialkylate systems as the dialkylate concentration increases.

The viscosity curves of FIG. 5 illustrate that DAPRAL T 210 is a more effective associative viscosifier than DAPRAL GT 282 and that DAPRAL T 212 is the most effective associative viscosifier of the three. Substantial differences in performance were noted. For instance, 2% GT 282 yielded a system viscosity of 10 cp whereas the viscosity of the 2% T 210 system was 30 cp and the 2% T 212 system was 145. The DAPPRAL T 212 system was not tested at 3% since a 2.25% concentration of the T 212 resulted in a system viscosity of 500 cp.

FIG. 6

Considerable flexibility in tailoring dialkylate systems can be achieved by using more than one dialkylate. For instance, if a surfactant system containing DAPRAL T 210 or T 212 is not phase stable at reservoir conditions or does not have the desired interfacial tension, then another dialkylate such as DAPRAL GT 282 can be incorporated into the system to restore phase stability. The greater water solubility of a different dialkylate such as the GT 282 can be used to shift phase behavior of the overall surfactant system towards greater water solubility. Combinations of DAPRAL T 210/GT 282 and DAPRAL GT 212/GT 282 Were tested as associative viscosifiers for LN-60COS and plotted in FIG. 6. Systems were prepared by mixing 5% LN-60COS with 3% DAPRAL combinations in 100,000 ppm TDS salinity. The DAPRAL mixture consisted of X% (DAPRAL T 210 or T 212) plus Y% DAPRAL GT 282 where X% plus Y% equals 3%.

Figure 6:
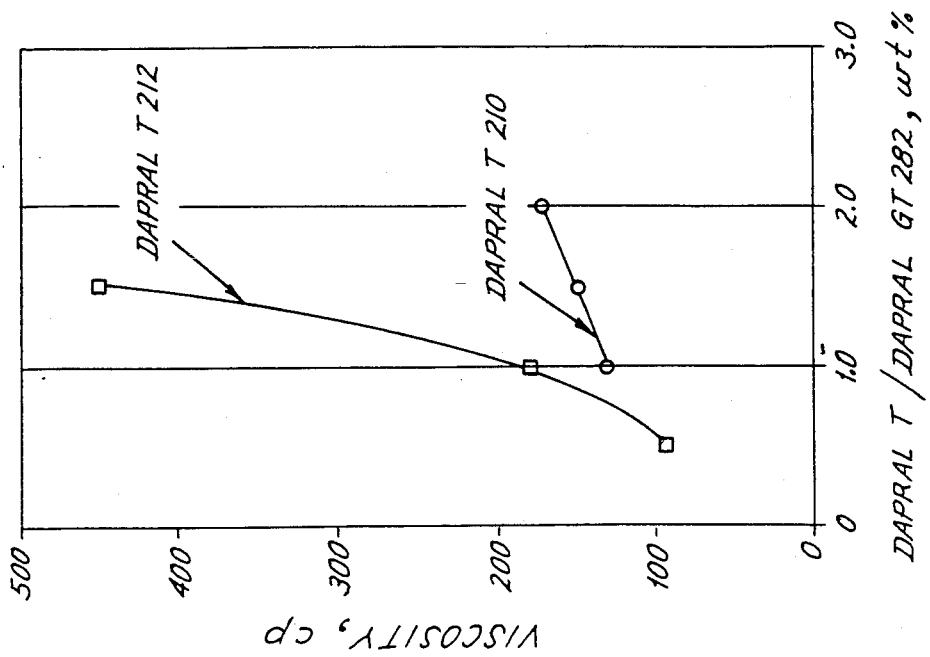
FIG. 6 is a graph plotting the increasing viscosity of several anionic surfactant/combination dialkylate systems as the concentrations of the two dialkylates in each system changes.

The viscosity curves of FIG. 6 indicate that DAPRAL T 212 is more efficient than DAPRAL T 210 when combined with the GT 282 dialkylate to impart viscosity to LN-60COS surfactant solutions. For example, the system of 1.5% T 210/1.5% GT 282 when formulated with 5% LN-60COS yielded a viscosity of 150 cp. On the other hand, 1.5% T 212/1.5% GT 282/5% LN-60COS exhibited a viscosity of 450 cp.

SHEAR AND CLOUD POINT EXAMPLES

The effect of shear on the viscosity of the LN-60COS/DAPRAL GT 282 system was determined by measuring viscosity before and after shearing. A solution of 5% LN-60COS and 2% DAPRAL GT 282 at 2.5% NaCl was sheared using a blender at about 1500 rpm for 60 seconds. The viscosity before shear was 48.7 cp and viscosity after shear was 48.8 cp. Actually, viscosity dropped off during the blender run, but the micellar networks reformed and thickened quickly after the shear ceased. In the few minutes required to physically take viscosity measurements, viscosity increased to the preshear level. These results indicate that the micellar network does not undergo any permanent breakdown in structure upon shearing.

Such a property is useful in surfactant flooding because injected fluids experience high shear when passing through the sandface around the wellbore. High molecular weight polymers currently used such as polyacrylamides are susceptible to shear degradation and viscosity loss, which is detrimental to their effectiveness as mobility control agents in enhanced oil recovery.

The cloud point of 5% LN-60COS/2.5% DAPRAL GT 282 at 2.5% NaCl was measured. It was in excess of 130° C. This value is substantially higher than the cloud point of 38° C. for 2.5% DAPRAL GT 282 and 2.5% NaCl. This cloud point elevation is another indicator for the formation of associated networks between the dialkylate molecules and the anionic surfactant micelles.

The rheological studies carried out with the invention surfactant systems demonstrate that one can viscosify micellar or microemulsion systems without having to use polymer which frequently exhibits incompatibility with surfactants at reservoir conditions. Even though LN-60COS was used as a model anionic surfactant in these tests, viscosification is expected to result with other types of surfactants such as synthetic alkylsulfonates, alkylarylsulfonates, ethoxylated alkylsulfonates and combinations of these surfactants with petroleum sulfonates. Increased viscosities are also expected to result in surfactant systems where various lignin derivatives including lignosulfonates are present as additives, and in lignin/amine surfactant systems where the dialkylate is incorporated as a viscosifier. Although it may not be necessary, it is anticipated that higher recovery efficiencies will be achieved if the thickened micellar slugs are followed with a polymer drive fluid.

Many other variations and modifications may be made in the concepts described above by those skilled in the art without departing from the concepts of the present invention. Accordingly, it should be clearly understood that the concepts disclosed in the description are illustrative only and are not intended as limitations on the scope of the invention.

What is claimed is:

1. A method of moving hydrocarbons through an underground hydrocarbon formation for recovery at a production well, which comprises:
   injecting into the formation about 0.05 to about 1.0 pore volumes of an aqueous surfactant system, said surfactant system comprising about 0.5% to about 10% of one or more surfactants and about 0.5% to about 10% of an alkoxylated dialkylate,
   said dialkylate having the formula:

$$R_1(R_3O)_nR_2$$

wherein $R_1$ and $R_2$ are alkyl chains having about 3 to about 30 carbon atoms, $R_3$ is $C_2H_4$, $C_3H_6$ or a mixture of $C_2H_4$ and $C_3H_6$, and n equals about 4 to about 300.

2. The method of claim 1, wherein n equals about 10 to about 250.

3. The method of claim 2, wherein $R_1$ and $R_2$ are alkyl chains having about 7 to about 20 carbon atoms.

4. The method of claim 1, wherein n equals about 30 to about 200.

5. The method of claim 4, wherein $R_1$ and $R_2$ are alkyl chains having about 7 to about 20 carbon atoms.

6. The method of claim 1, wherein one or more surfactants are anionic surfactants.

7. The method of claim 6, wherein the anionic surfactant is a sulfated ethoxylated alcohol having about 10 to about 16 carbon atoms and about 5 to about 8 ethylene oxide groups.

8. The method of claim 1, wherein one or more surfactants are nonionic surfactants.

9. The method of claim 1, wherein one or more surfactants are cationic surfactants.

10. The method of claim 1, wherein one or more surfactants are amphoteric surfactants.

11. The method of claim 1, wherein $R_1$ and $R_2$ are alkyl chains having about 12 to about 20 carbon atoms and n equals about 50 to about 200.

12. The method of claim 1, wherein $R_1$ and $R_2$ are alkyl chains having about 6 to about 12 carbon atoms and n equals about 150 to about 200.

13. The method of claim 1, wherein the surfactant system comprises two or more alkoxylated dialkylates having different formulas.

14. A method of moving hydrocarbons through an underground hydrocarbon formation for recovery at a production well, which comprises:
    injecting into the formation about 0.1 to about 0.3 pore volumes of an aqueous surfactant system, said surfactant system comprising about 1% to about 5% of one or more surfactants and about 1% to about 5% of an alkoxylated dialkylate,
    said dialkylate having the formula:

$$R_1(R_3O)_nR_2$$

wherein $R_1$ and $R_2$ are alkyl chains having about 7 to about 20 carbon atoms, $R_3$ is $C_2H_4$, $C_3H_6$ or a mixture of $C_2H_4$ and $C_3H_6$, and n equals about 30 to about 200.

* * * * *